United States Patent [19]

Mueller

[11] Patent Number: 5,008,066
[45] Date of Patent: Apr. 16, 1991

[54] CONTAINER WITH A UNITARY CLOSURE AND METHOD FOR MAKING SAME

[75] Inventor: Bruce M. Mueller, Crystal Lake, Ill.
[73] Assignee: Seaquist Closures, Crystal Lake, Ill.
[21] Appl. No.: 334,301
[22] Filed: Apr. 6, 1989
[51] Int. Cl.⁵ .................. B29C 49/06; B65D 55/16
[52] U.S. Cl. .................... 264/537; 215/306; 220/375; 425/525
[58] Field of Search ............ 215/306, 256, DIG. 1; 220/375; 264/516, DIG. 1, DIG. 64, 537-539; 425/525, 533, DIG. 243, DIG. 247

[56] References Cited

U.S. PATENT DOCUMENTS

| | | | |
|---|---|---|---|
| 2,778,533 | 1/1957 | Savary | 425/525 |
| 3,086,249 | 4/1963 | Nelson et al. | 220/375 |
| 3,235,117 | 2/1966 | Mason, Jr. | 215/306 X |
| 3,380,608 | 4/1968 | Morbeck | 215/1 C |
| 3,874,570 | 4/1975 | Katzman | 222/543 |
| 4,197,955 | 4/1980 | Luenser | 215/252 |
| 4,251,002 | 2/1981 | Middleton | 215/253 |
| 4,390,111 | 6/1983 | Robbins et al. | 220/375 X |
| 4,435,147 | 3/1984 | Myers et al. | 425/533 X |
| 4,439,393 | 3/1984 | Saito et al. | 425/525 X |
| 4,474,302 | 10/1984 | Goldberg et al. | 215/306 X |
| 4,522,308 | 6/1985 | Sullivan | 215/253 |
| 4,548,332 | 10/1985 | Neat | 220/268 |
| 4,604,044 | 8/1986 | Hafele | 425/533 X |
| 4,655,363 | 4/1987 | Neat | 220/375 X |
| 4,755,356 | 7/1988 | Robbins et al. | 220/375 X |
| 4,773,559 | 9/1988 | Sasaki et al. | 220/375 X |

FOREIGN PATENT DOCUMENTS

| | | | |
|---|---|---|---|
| 209870 | 1/1956 | Australia | 215/DIG. 1 |
| 515115 | 11/1952 | Belgium | 215/306 |
| 2714917 | 10/1978 | Fed. Rep. of Germany | 425/525 |
| 2273448 | 12/1975 | France | 215/306 |
| 3033243 | 2/1988 | Japan | 264/537 |
| 1039022 | 8/1966 | United Kingdom | 215/DIG. 1 |
| 2121392 | 12/1983 | United Kingdom | 215/256 |

Primary Examiner—Stephen Marcus
Attorney, Agent, or Firm—Dressler, Goldsmith, Shore, Sutker & Milnamow, Ltd.

[57] ABSTRACT

A container having a unitary hollow receptacle and closure is formed according to a process is which an injection molding step forms a preform of thermoplastic material having (1) a hollow body, (2) a closure base at one end of the hollow body to define an opening into the hollow body, and (3) a closure cover spaced from the closure base opening but connected to the closure base. The process further includes blow molding the preform hollow body to form the hollow receptacle so that it extends from the closure base and has a configuration different than the preform hollow body.

5 Claims, 1 Drawing Sheet

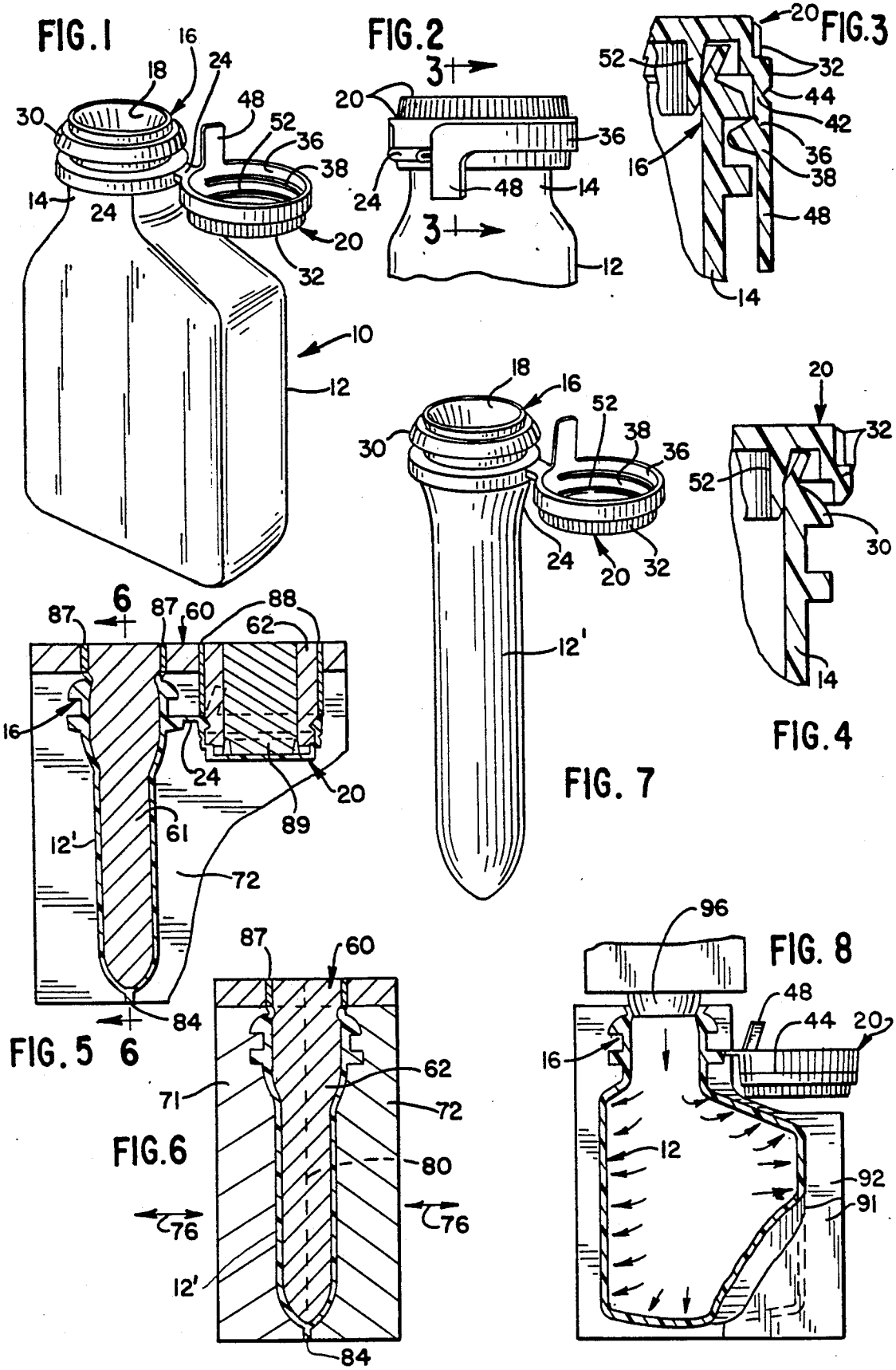

CONTAINER WITH A UNITARY CLOSURE AND METHOD FOR MAKING SAME

TECHNICAL FIELD

This invention relates to a unique two-step molding process or method, to a container formed by that process, and to an intermediate preform fabricated in the first step of that process. The molding process of this invention is particularly well suited to the production of a container having a unitary hollow receptacle and closure wherein (1) the closure includes (a) a closure base at the upper end of the receptacle and (b) a closure cover hinged to the closure base and (2) the closure may be readily provided with a tamper-evident feature.

BACKGROUND OF THE INVENTION AND TECHNICAL PROBLEMS POSED BY THE PRIOR ART

A conventional method for fabricating a container or bottle from thermoplastic material includes a first step in which a preform is injection molded in the form of an open-ended tube.

In a second step of the conventional method, the preform tube is blow molded to expand the tube into a blow molding cavity which defines the final shape of the bottle. The final shape includes the main, hollow, receptacle portion of the container as well as the neck which defines the open end. Typically, the neck may be provided with threads, a snap-on bead, or other "finish" for receiving a separately manufactured closure cap, cover, or the like.

The closure, cover, or cap is conventionally manufactured in a separate process and, by a subsequent action, the closure, cover, or cap is assembled onto the container.

It would be desirable to provide an improved, more efficient fabrication process for fabricating a container and closure.

Further, it would be desirable to provide an improved process in which a container can be fabricated with a unitary, hollow receptacle and closure.

Also, it would be beneficial if the process could readily accommodate the inclusion of a tamper-evident structure.

SUMMARY OF THE INVENTION

A method or process is provided for forming a novel, unitary container having a unitary hollow receptacle and closure. The method includes a first step of injection molding a preform of thermoplastic material in the form of (1) a hollow body, (2) a closure base at one end of the hollow body to define an opening into the hollow body, and (3) a closure cover spaced from the closure base opening but connected to the closure base.

The connection of the closure cover to the closure base permits the closure cover to be engaged with the closure base in a closed position for occluding the opening and permits the closure cover to be disengaged from the closure base when a substance is to be loaded into, or dispensed out of, the opening.

The method further includes blow molding the preform hollow body to form the hollow receptacle so that it extends from the closure base and has a configuration different than the preform hollow body.

The method of the present invention is especially adapted for fabricating a container in which at least part of the hollow receptacle is larger than the opening defined by the closure base at the top of the receptacle.

The method of the present invention is also especially adapted for fabricating the unique container of the present invention wherein the container has a unitary hollow receptacle and closure and wherein, in the preferred embodiment, the closure includes a closure base unitary with the top of the receptacle and a closure cover connected in a unitary manner to the closure base by means of a hinge.

The novel method of the present invention permits the formation of a unique preform in one injection molding step. The preform includes the container closure base and attached cover, as well as any interconnecting unitary hinge. The second step, which involves blow molding the desired hollow receptacle of the container, can be readily accomplished at any time following completion of the first, injection molding step.

Further, the completed container can then be filled in a conventional filling line in a well-known manner except that the normally troublesome separate closure fabrication process and closure assembly process, along with the related equipment, can be eliminated. Instead, only a simple mechanical closing device need be used on the filling line to close the attached cover.

The cover and cooperating closure base on the receptacle portion of the container can be readily provided with a tamper-evident or tamper-resistant structure. The tamper-resistant structure can be readily formed during the injection molding step.

Numerous other advantages and features of the present invention will become readily apparent from the following detailed description of the invention from the claims and from the accompanying drawings.

BRIEF DESCRIPTION OF THE DRAWINGS

In the accompanying drawings forming part of the specification, in which like numerals are employed to designate like parts throughout the same are, FIG. 1 is a perspective view of a preferred embodiment of a completed container of the present invention showing the as-molded configuration of the closure cover in the full open position with a tamper-evident peripheral band not yet engaged with the closure base;

FIG. 2 is an enlarged, fragmentary, elevation view of the container of FIG. 1 with the closure cover shown in the closed position and with the tamper-indicating peripheral band engaged with the closure base;

FIG. 3 is a greatly enlarged, fragmentary, cross-sectional view taken generally along the plane 3—3 in FIG. 2;

FIG. 4 is a view similar to FIG. 3, but showing the structure after the tamper-indicating peripheral band has been torn away from the closure cover;

FIG. 5 is a simplified diagram, partly in fragmentary cross section, showing the injection molding of the preform of the container in one of two mold halves;

FIG. 6 is a cross-sectional view taken generally along the plane 6—6 in FIG. 5;

FIG. 7 is an enlarged, perspective view of the preform after it has been removed from the injection molds illustrated in FIGS. 5 and 6, but prior to the blow molding step; and FIG. 8 is a fragmentary, simplified diagram, partly in cross section and with portions of the components broken away to better illustrate interior detail and the blow molding of the preform to form the container shown in FIG. 1.

DESCRIPTION OF THE pREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the container of the present invention, and the apparatus for fabricating the container of the present invention, is described in the normal (upright) operating position, and terms such as upper, lower, horizontal, etc., are used with reference to this position. It will be understood, however, that the method may be effected in other orientations.

The molding apparatus used in accordance with the method of the present invention includes certain conventional molding components. The details of the components, although not fully illustrated or described, will be apparent to those having skill in the art and an understanding of the necessary functions of such components.

Some of the figures illustrating the molding apparatus show structural details and mechanical elements that will be recognized by one skilled in the art. However, detailed descriptions of such elements are not necessary to an understanding of the invention, and accordingly, are not herein presented.

Referring now to the drawings, a preferred embodiment of a container of the present invention is designated generally by reference numeral 10 in FIG. 1. The container 10 includes a main hollow portion or receptacle 12 having reduced cross-sectional dimensions at a neck 14 which terminates at the top of the receptacle 12 in a closure base 16 defining an opening 18.

In the preferred embodiment illustrated, the closure base 16 may be characterized as having a generally overall circular shape in plan view, and the opening 18 may be characterized as having a circular opening.

The receptacle 12 of the container may have any suitable configuration, including a generally cylindrical configuration (not illustrated), and may have a substantial portion in the form of a generally right rectangular prism as illustrated.

The closure base 16 is molded (by means described hereinafter) so that it is unitary with the receptacle 12 and with an attached closure cover 20. Thus, the closure cover 20, closure base 16, and receptacle 12 form a unitary container 10. Preferably, the cover 20 is connected by a connecting portion, strap, or hinge 24 which is also a unitary part of the container 10.

According to one aspect of the teachings of the present invention, the closure, comprising the closure base 16, cover 20, and hinge 24 or other connecting means or structure, may be provided with a tamper-resistant structure, a tamper-evident structure (i.e., tamper-indicating structure), or the like.

The preferred embodiment of the container 10 includes one such tamper-indicating structure as best illustrated in FIGS. 1–4. In particular, the closure base 16 includes a radially outwardly extending peripheral flange 30. The closure cover 20 includes a cover lid 32 for occluding the opening 18 of the closure base 16 and for extending outwardly and down over the upper edge of the closure base 16.

The closure cover 20 further includes a peripheral band 36 which has a radially inwardly projecting lip 38 for engaging the closure base flange 30 when the closure cover 20 is engaged with the closure base 16 in a closed position.

The peripheral band 36 is unitary with the cover lid 32 and is connected thereto by a reduced thickness section of material forming a frangible web 42 adjacent an inwardly extending V-shaped groove 44 (FIG. 3). Alternatively, the groove 44 may be formed on the inner peripheral surface of the frangible web 42 (not illustrated). The band 36 may be pulled so as to break the frangible web 42 and separate the band 36 from the closure cover lid portion 32. To aid in this operation, the band 36 may include an outwardly projecting pull tab 48 (FIG. 3).

It will be seen that pulling the closure cover peripheral band 36 away from the closure cover lid 32 will cause the frangible web 42 to break and will disengage the radially inwardly projecting lip 38 from the radially outwardly projecting peripheral flange 30. This will permit opening of the closure cover 20.

The frangible web 42 preferably extends around a major portion of the periphery of the closure cover 20. However, the band 36 and lip 38 preferably terminate adjacent each side of the hinge 24 so that the hinge 24 may remain connected to the closure cover lid 32 after the band 36 is removed.

If desired, the closure cover 20 and the closure base 16 may be provided with suitable snap-fit engaging structures (not illustrated) to hold the closure cover 20 in a normally closed position on the closure base 16 while still permitting the closure cover 20 to be easily lifted off (after, of course, the tamper-resistant band 36 has been torn away). Alternately, the closure cover lid 32 may be provided with a downwardly projecting, annular plug 52 (FIG. 3) for being received into the interior opening 18 of the upper end of the neck 14. The plug 52 and/or the neck 14 may be provided with an appropriate snap-fit bead or other structure (not illustrated) for effecting a snap-fit engagement.

The container 10 is molded according to the novel process of the invention by first injection molding a preform consisting of thermoplastic material having the configuration illustrated in FIG. 7. The preform includes the following: (1) a hollow body 12' which ultimately becomes the receptacle 12 of the completed container, (2) the closure base 16 at the upper end of the hollow body 12' to define the opening 18 into the hollow body 12', (3) the hinge 24, and (4) the closure cover 20 spaced from the opening of the closure base 16 but connected to the closure base 16 by the hinge 24.

The preform is injection molded as diagrammatically illustrated in FIGS. 5 and 6. Specifically, the method comprises providing an initially open first assembly of injection mold parts which include a core 60 and an open split mold having spaced-apart injection mold halves 71 and 72 (FIG. 6).

The mold halves 71 and 72 are conventionally moveable toward and away from each other as illustrated by the arrows 76 and FIG. 6. In the closed position, the mold halves 71 and 72 meet at a parting plane 80.

The mold halves 71 and 72, when closed about the core 60, define a forming cavity for the preform and also define a flow channel gate 84 through which the thermoplastic material may be injected into the injection mold assembly.

The core 60 includes a first projecting core portion 61 for defining the inside surfaces of the preform hollow body 12' and the closure base 16. The core 60 also includes a second projecting core portion 62 for defining the inside surfaces of the closure cover 20.

Conventional movable stripper rings 87 and 88 are provided in the mold assembly around the top of the core portion 61 and core portion 62, respectively. A conventional movable knockout core 89 is provided in a cylindrical receiving cavity in the core portion 62.

The thermoplastic material is injected according to conventional practice through the gate 84 and flows inside the closed mold halves 71 and 72 around the core first portion 61. Some of the thermoplastic material flows through the region of the hinge 24 and around the second projecting core portion 62 to form the closure cover 20. The thermoplastic material that solidifies in the region between the cover 20 and the preform hollow body 12' forms the hinge 24.

After the preform has been molded as illustrated in FIG. 5, the mold halves 71 and 72 are first opended to permit ejection of the preform 12', closure base 16, hinge 24, cover 20, and band 36 as a unitary molded part from projecting core portions 61 and 62 which extend from the core assembly 60. Ejection of the unitary preform assembly is accomplished by the simultaneous pushing action of stripper rings 87 and 88 and knockout core 89. To this end, it is realized that the closure cover 20 is sufficiently resilient to stretch and flex outwardly to permit passage of its inwardly projecting lip 38 over the downwardly projecting core portion 62.

Next, the preform, while still hot, is transferred to a conventional blow molding apparatus as schematically illustrated in FIG. 8. The blow molding apparatus includes a second assembly of molding parts comprising split blow mold halves 91 and 92 which are moveable in directions perpendicular to the parting plane defined by the contacting faces of the two closed mold halves 91 and 92. In the preferred embodiment illustrated, the parting plane of the blow mold halves 91 and 92 has the same planar orientation with respect to the preform as does the parting plane of the injection mold halves 71 and 72.

The split blow mold halves 91 and 92, when they are closed, define a cavity that includes (1) a closure base cavity portion for receiving the closure base 16 and (2) a receptacle cavity portion for receiving the preform hollow body 12' —— but the receptacle cavity portion has a configuration of the receptacle 12 of the completed container 10.

The blow molding assembly further includes a conventional blowing tube 96 which can be extended into the opening of the preform closure base 16 for sealing the interior of at least the preform hollow body 12' from ambient atmosphere. In accordance with conventional techniques, a pressurized gas is blown into the preform hollow body 12' to form the preform hollow body 12' into the hollow receptacle 12 conforming to the configuration of the receptable cavity portion of the closed blow mold halves 91 and 92.

Subsequently, the blowing tube 96 is retracted from the opening, and the split blow mold halves 91 and 92 are opened to permit removal of the formed container 10.

Preferably, the above-described process for molding the container 10 includes molding the container 10 with the closure cover 20 oriented in a position about the hinge 24 that is substantially 180° from the closed position, and this molding position is illustrated in FIGS. 1, 5, 7, and 8. This permits the closure base 16, hinge 24, and cover 20 to be easily molded and permits the finished container 10 to be subsequently filled without requiring manipulation of the closure in order to permit full access to the interior of the container 10.

Further, although the process of the present invention has been illustrated with respect to forming a container 10 having a closure with a particular tamper-evident structure, it is to be realized that other forms of tamper-evident structures may be provided. Of course, such tamper-evident structures may be eliminated altogether.

With the container 10 of the present invention having the particular tamper-evident structure illustrated, the container 10 may be readily filled with a conventional filling mechanism (not illustrated). Subsequently, the closure cover 20 may be easily closed with a simple, conventional mechanical closing device (not illustrated). The closing of the cover 20 over the closure base 16 is, of course, effected with sufficient force so as to temporarily deform the peripheral band 36 outwardly so that the inwardly projecting lip 38 slides over the outwardly projecting peripheral flange 30 of the closure base 16 and becomes interlocked therewith.

The novel container 10 of the present invention, and the novel process for fabricating the container, eliminate the need for separate closure fabrication equipment and processes. Also, the need in the filling line for separate apparatus to assemble the closure base (with or without an attached cover) onto the container is eliminated since the closure is a unitary part of the empty container 10 as molded.

It will be readily observed from the foregoing detailed description of the invention and from the illustrated embodiment thereof that numerous variations and modifications may be effected without departing from the true spirit and scope of the novel concepts or principles of this invention.

What is claimed is:

1. A method for forming a container having a unitary hollow receptacle and closure comprising the sequential steps of:

(A) molding a preform of thermoplastic material, said molding of the preform including the injection molding of (1) a hollow body, (2) a closure base at one end of said hollow body to define an opening into said hollow body, and (3) a closure cover complementary to and spaced from said closure base opening but connected to said closure base to permit said closure cover to be swung about an axis between (1) a closed position engaged with said closure base for occluding said opening and (2) an open position disengaged from said closure base in the region over said opening when a substance is to be loaded into, or dispensed out of, said opening, said injection molding including providing an initially open assembly of first mold parts including a core and an open split mold having spaced-apart injection mold halves adapted to be positioned about said core relative to an injection mold parting plane, each said injection mold half being movable along a common line of action away from the other mold half to an open position and being movable along said common line of action toward the other mold half to a closed position in which said closed injection mold halves define a flow channel gate and a communicating forming cavity for said preform hollow body, closure base, and closure cover, said core including a first projecting core portion for defining the inside surfaces of said preform hollow body and closure base and having a second projecting core portion for defining the inside surfaces of said closure cover, said injection molding further including subsequently closing said injection mold halves about said first and second projecting core portions and injecting said thermoplastic material through said flow channel gate to mold said preform hollow body, closure base, and closure cover together from a single injection of said material, each said complementary closure base and closure cover being of completed finish, shape, and size upon the completion of step (A); and (B) after the completion of step (A), blow molding said preform hollow body to form said hollow receptacle extending from said closure base and having a configuration different than said preform hollow body, said blow molding step including (1) providing second mold parts in the form of a blow molding assembly of split blow mold halves initially positioned in an open position about said preform hollow body relative to a blow mold parting plane which has the same planar orientation with respect to said preform as does the injection mold parting plane and, (2) closing said blow mold halves by moving them in opposing directions perpendicular to the blow mold parting plane and parallel to the directions of movement of said injection mold halves.

2. The method in accordance with claim 1 in which step (A) includes injection molding said preform to include a hinge means for connecting said closure base to said closure cover.

3. The method in accordance with claim 1 in which step
 (B) includes
  (1) first providing said blow mold halves which, when closed, define a cavity having (a) a closure base cavity portion for receiving said closure base and (b) a receptacle cavity portion for receiving said preform hollow body, and
  (2) then effecting the following steps:
   (i) closing said blow mold halves to position said blow mold halves in engagement with the exterior surface of said closure base with at least portions of said preform hollow body disposed inwardly of the mold surface of said receptacle cavity portion,
   (ii) extending a blowing tube into said preform closure base opening and sealing the interior of said preform hollow body from ambient atmosphere,
   (iii) blowing a pressurized gas into said preform hollow body to form said preform hollow body into said hollow receptacle conforming to the configuration of said receptacle cavity portion of said blow mold halves,
   (iv) retracting said blowing tube from said opening, and
   (v) opening said blow mold halves to permit removal of said formed container.

4. The method in accordance with claim 1 in which step (A) includes injection molding said closure base with a radially outwardly extending peripheral flange and molding said closure cover to include a lid and a peripheral band having a radially inwardly projecting lip for engaging said closure base flange when said closure cover is engaged with said closure base in a closed position, said step of molding said closure cover including molding said closure cover peripheral band with a frangible web connecting said band to said closure cover lid whereby, after the container is formed, said closure cover can be closed with said peripheral band lip lockingly engaging said closure base flange and whereby said band is adapted to be subsequently gripped and pulled to break said frangible web and remove said band from said closure cover lid thereby disengaging said band lip from said closure base flange to permit said closure cover lid to be disengaged from said closure base.

5. The method in accordance with claim 1 in which step (A) includes molding a hinge means for connecting said closure cover and said closure base with said closure cover being oriented in a position about said hinge that is substantially 180 degrees from said closed position.

* * * * *